United States Patent

[11] 3,555,963

| [72] | Inventor | Donald J. Evans |
| | | Waynesboro, Va. |
| [21] | Appl. No. | 764,119 |
| [22] | Filed | Oct. 1, 1968 |
| [45] | Patented | Jan. 19, 1971 |
| [73] | Assignee | General Electric Company |
| | | a corporation of New York |

[54] REMOVABLE HEAD FOR A MACHINE TOOL
9 Claims, 15 Drawing Figs.

[52] U.S. Cl. .................................................. 90/11,
29/26, 77/22
[51] Int. Cl. ........................................................ B23c 1/00,
B23b 39/00, B23b 39/16
[50] Field of Search ............................................. 90/11, 11.3;
77/4, 22; 29/26

[56] References Cited
UNITED STATES PATENTS

| 3,028,770 | 4/1962 | Pittwood ...................... | 77/4 |
| 3,099,873 | 8/1963 | Brainard et al. .............. | 29/26 |
| 3,124,976 | 3/1964 | Pittwood ...................... | 77/4 |
| 3,280,659 | 10/1966 | Allen ........................... | 77/1 |

*Primary Examiner*—Gil Weidenfeld
*Attorneys*—Lawrence G. Norris, Michael Masnik, Stanley C. Corwin, Frank L. Neuhauser, Oscar B. Waddell and Melvin M. Goldenberg ABSTRACT: An automatic spindle transfer machine of the type known as boring, tapping, drilling, reaming, turning or milling machine, is provided with a removable spindle toolholder. A conveyor or transfer mechanism is used to convey to and away from the work station the worked and unworked parts. Suitable pallets for different toolholders are provided which enable the transfer mechanism to remove a spindle toolholder from the machine and to substitute a new toolholder suitable for another operation. The organization of several production lines using this toolholder removing technique is described.

INVENTOR.
DONALD J. EVANS
BY *Michael Masnik*
HIS ATTORNEY

INVENTOR.
DONALD J. EVANS
BY Michael Masnik
HIS ATTORNEY

INVENTOR.
DONALD J. EVANS
BY *Michael Masnik*
HIS ATTORNEY

INVENTOR.
DONALD J. EVANS
BY Michael Masnik
HIS ATTORNEY

3,555,963

REMOVABLE HEAD FOR A MACHINE TOOL

BACKGROUND OF THE INVENTION

The present invention relates to machine tools in general and, more particularly, to improvement in automatic spindle machines of the type known as boring, tapping, drilling, turning or milling machines.

It is already known to provide the toolholder of an automatic machine with a plurality of spindles, each of which may receive and drive a separate tool. Using this kind of automatic machine, the fabrication of a complicated workpiece which requires many operations of the same or different type, such as drilling several bores, tapping or threading is performed in a time substantially less than required by conventional single tool machines because the workpiece is subjected to continuous operations on the same machine.

It is also known to assemble a plurality of multiple spindle machines into a production line which is capable of subjecting a workpiece to a large number of different operations. For instance, the workpiece is mounted on a slide or other suitable means and is advanced in an automatic transfer line from station to station, where it is subjected to the different operations. Of course, control means for operating positioning devices are provided. The positioning devices clamp the workpiece at each station in a requisite position, so that the subsequent operations are performed with utmost precision in relation to one another. These positioning devices can act on the workpiece directly or on the slide onto which the workpiece is mounted, according to the form and the operations to which the workpiece must be subjected. So far as the continuous operations performed are concerned, these are inherently precise because the relative positions of the tools on the multiple spindle holder are fixed.

Such production lines offer high productivity and are particularly suitable for mass production, but they are inflexible, that is, it is very difficult and expensive to modify the machines blocks in a transfer line in order to treat different kinds of workpieces. Generally, this is accomplished by using toolholders wherein the distance between the spindles, the number of spindles, and certain other characteristics (such as, for instance, the ratio between rotational speed of the spindles) may be changed to a certain extent.

Automatic tool exchange has also been provided, and in some sophisticated cases, when extensive changes are required, the automatic exchange of the toolholders has also been proposed. These solutions are time-consuming or require very complicated devices for bringing and removing the tools or the toolholders to and from the transfer line machines.

Accordingly, it is an important object of the present invention to provide a versatile automatic multiple spindle machine with removable tool heads comprising at least one toolholder and associated tool and gearing in which such heads are exchanged using the same conveying means, and transfer devices provided for conveying workpieces and for operating the heads without any addition of conveying means and in substantially less time than required before.

Another object of the invention is to provide an automatic multiple spindle machine with interchangeable heads which, because of its inherent simplicity and speed in exchanging the head, may replace several different machines and working stations in a transfer line, thus reducing the cost of the line itself and advantageously extending the range of use of the transfer lines in the middle series production.

Another object of the invention is to provide an automatic multiple spindle machine with interchangeable heads which enables a fast tool change when the tools become dull, thus increasing the efficiency of a transfer line for mass production.

These objects can be obtained in the most elementary case by simply adding interchanging and locking means for the head to a conventional multiple spindle machine and eventually by the use of suitable pallets for the same.

Briefly stated, according to the invention, the machine tool is provided with a frame, elongated guide means on said frame, a slide reciprocably mounted on said guide means, interchanging and locking means for securing a head to said slide, a workpiece conveyor, for instance in the form of a second elongated guide means and a second slide reciprocably mounted on said second guide means. The second slide is also used to convey to and away from the working station and, at any time it is required, suitable pallets for the head. An empty pallet is first carried to the working station where it receives the head that must be changed. Subsequently, the pallet with the previously used head is removed from the work station and at the same time a new replacement head on its pallet is carried to the work station and automatically secured to the slide.

Power means for operating the slides, the tools, the positioning and locking means for the head and the workpiece are provided and consist of conventional devices, such as, for instance, hydraulic linear or rotating actuators, and variable speed electric motors.

The novel features and methods of operation which are considered as characteristic of the invention are set forth in the appended claims. However, an embodiment of the improved automatic machine itself, both as to its construction and its mode of operation, together with additional features will be best understood by reading the following detailed description of certain specific embodiments with reference to the accompanying drawings in which:

Figure 1:
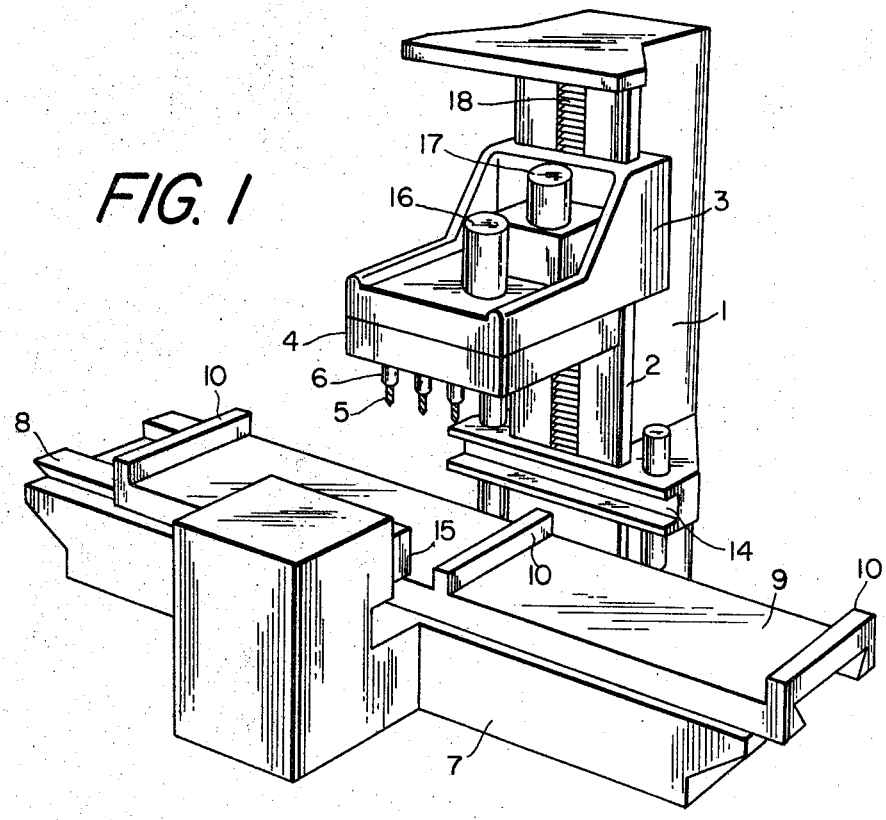
FIG. 1 is a schematic perspective view of a machine which constitutes a vertical-multiple spindle boring machine, and is constructed according to the present invention.

Referring now to FIG. 1, there is shown a vertical boring machine which comprises a main support or frame 1 having elongated vertical guide means in form of rails 2 on the front thereof, supporting a reciprocable frame in the form of a toolholder driving slide 3. The slide 3 bears detachably connected head 4, which carries a plurality of vertically and forwardly extending boring tools 5, mounted in rotary spindles 6. The head 4 includes connecting means and registering means cooperating with reciprocable connecting means in the slide 3.

These devices described hereinafter in a preferred form of embodiments are provided to position the head with reference to the slide and to lock the toolholder to the slide. The frame 1 is rigidly connected with a pedestal 7, which extends laterally from the working station. This pedestal carries on its upper side elongated horizontal means in the form of rails 8, supporting a reciprocable frame in the form of a workpiece transfer slide 9.

Figure 1A:
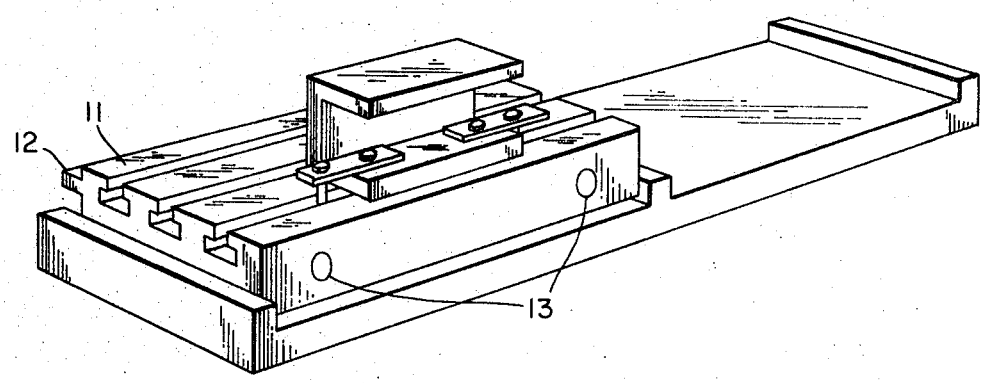
FIG. 1A is a schematic perspective view of a pallet for conveying workpieces with a workpiece mounted thereon.

The transfer slide 9 is provided with shoulders 10 or other suitable means which insure a rough positioning of the workpieces relative to said slide. Alternatively, the workpieces can be mounted and locked onto suitable pallets 11, as represented in FIG. 1A and the shoulders 10 insure a rough positioning of the pallets, and therefore indirectly of the workpiece, relatively to the transfer slide. The pallets 11, at their turn, present more accurate positioning means, such as, for instance, the guide 12 (FIG. 1A) and the sockets 13 (FIG. 1A) respectively cooperating with a reciprocable groove 14 and pins (not shown) mounted on a jaw 15 which firmly locks the pallets in the work station. Of course, if required, accurate positioning means can be provided operating directly on the workpiece and locking it firmly in the work station.

While any number of arrangements can be used for accurate positioning of the workpieces, further details about specific means will be given hereafter.

In FIG. 1, a variable speed electric motor 16 is shown mounted on the slide 3 for operating the spindles of the head, and a second reversible motor 17 is also shown, for actuating the slide 3 via worm gears, pinion, and a rack 18 mounted on the frame 1 between the rails 2. Of course, these devices are representative only of a suggested embodiment, being considered obvious that they may be substituted by other suitable operating motors and mechanical transmission means.

Figure 2:
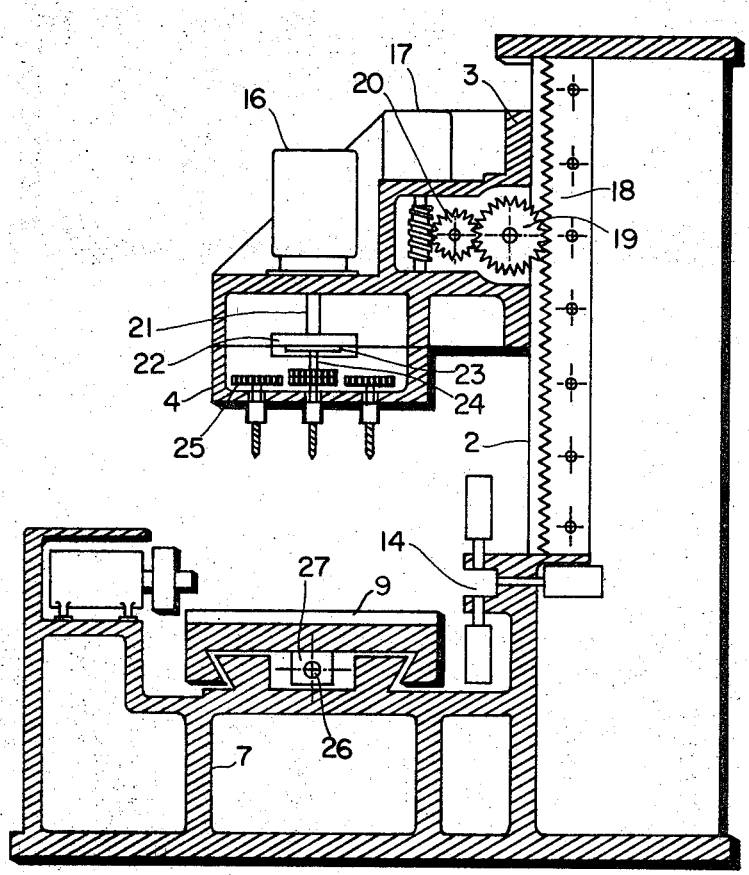
FIG. 2 is a longitudinal vertical section through the machine of FIG. 1.

FIG. 2 represents a longitudinal vertical section view through the boring machine of FIG. 1. In this section are shown the rack 18, cooperating with a pinion 19 mounted inside the slide 3 and operated by the motor 17 via worm gears 19 and driven pinion 20. The variable speed motor 16 actuates the tools via an output shaft 21 carrying a first clutch element 22 axially shiftable so as to engage with a second clutch element 23 rigidly mounted on a second shaft 24.

This shaft 24 in its turn operates the tools via gear transmission gearing 25. FIG. 2 also shows in section a lead screw 26 mounted in the pedestal 7, and rotated by any suitable operating means to position the transfer slide 9, which presents on its bottom a female screw 27 engaged with the lead screw 26.

Figure 3A:
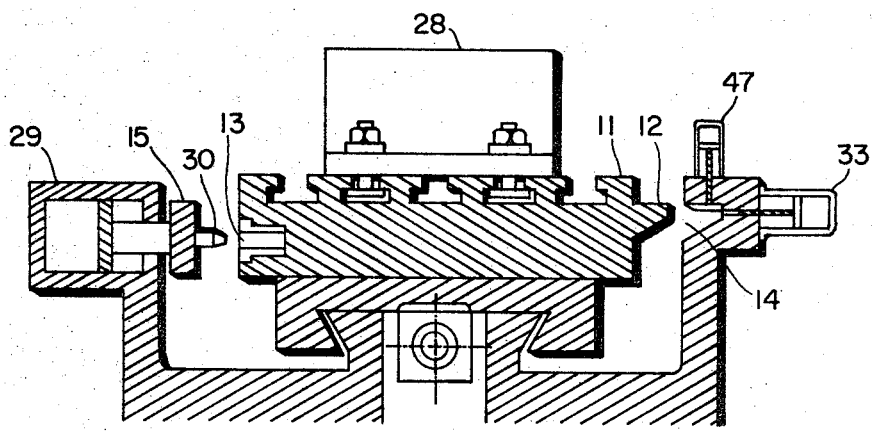
FIGS. 3A and 3B are two embodiments of invention showing an enlarged fragmentary longitudinal vertical section showing the transfer slide of the machine, a workpiece pallet, and clamping means for the pallets.

In FIG. 3A the positioning means are schematically represented in section for accurate positioning and locking of a pallet 11 at the working station. A workpiece 28 is rigidly mounted with suitable clamping means on the pallet 11. As described before, the pallet presents on one side a guide 12 which is preferably shaped in the form of a wedge. On the opposite side of the pallet are provided two cylindrical sockets 13. In correspondence with these sockets, two pins 30, constituted by a cylindrical portion with frustroconical top, are precisely mounted on the jaw 15. The jaw 15 is operated by two hydraulic direct-reverse actuators 29 to clamp the pallet at the working station. When the actuator 29 is low-pressure direct operated, the pins 30 engage in the sockets 13. If there is some inaccuracy in the positioning of the pallet, provided by the transfer slide, this is corrected by the first conical part of the pins 30, so that vertical and transversal accurate positioning is achieved when the pins are completely engaged in their respective sockets 13. At this point, the jaw 15 pushes the guide 12 into the groove 14 until the top plane of the indentation contacts the bottom of the groove. At the same time, the sloped plane of the indentation glides on the reciprocating plane of the groove 14 so that finally the pallet is lightly lifted from the transfer slide. At this point, the pressure in the hydraulic actuator 29 is suitably increased and also a pair of actuators 47 are operated. These actuators 47 lock the guide 12 in the groove 14. Consequently, the pallet 11 and the workpiece 28 are firmly clamped in the working station, by the joint effect of the jaw and the groove, and the machining of the workpiece can be initiated. Incidentally, it is useful to remark that during the workpiece machining, no mechanical stresses are borne by the transfer slide so that different kinds of transfer slides, other than that represented, can be used.

Figure 3B:
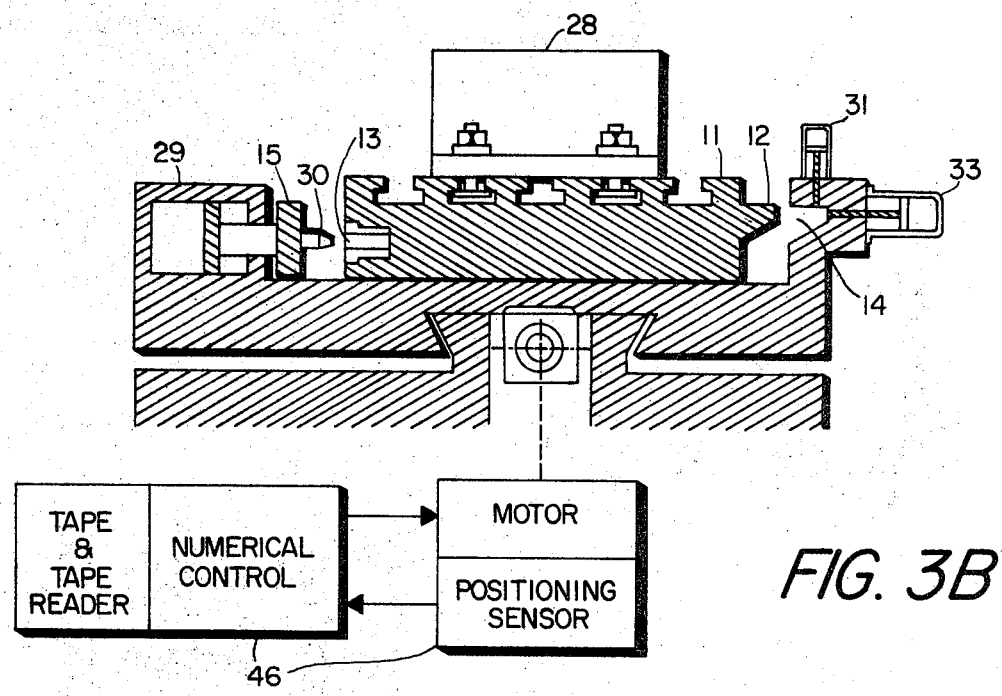

In FIG. 3B, there is shown an arrangement similar to 3A except that the accurate positioning mechanism for locating the workpiece and/or the toolholder pallet on transfer slide 9 and for attaching or detaching it therefrom has been moved from the bed of the machine and is now mounted on the slide 9. A positioning control 46, such as a numerical positioning control, has been added to position the slide under the head. The transfer slide and pallet is then accurately moved or operated with respect to the guide or slide of the machine tool by the positioning control 46. Where the positioning control is a numerical control, the positioning commands may be available from a tape and tape reader and the positioning force provided by a motor associated with a positioning sensor and numerical control as is well known in the art.

Figure 4:
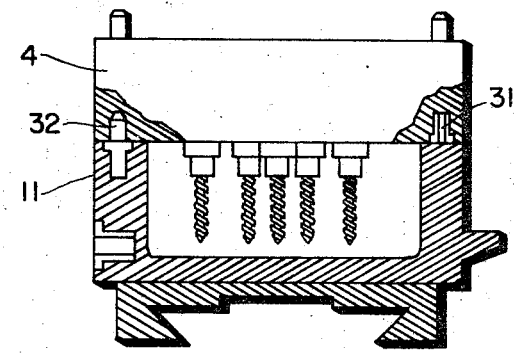
FIG. 4 is a schematic section of a pallet suitable for holding a head.

The same positioning means can be used to accurately position a pallet suitable for conveying a head to or away from the work station. This pallet will be preferably shaped in the form of a box, with the same guide 12 and sockets 13 described above. The upper edge of the pallets provides a reference plane for the toolholder and the relative positioning can be insured by sockets and pins similar to those heretofore described. FIG. 4 represents in section this kind of pallet with a head disposed therein. The reference sockets and pins are identified in the FIG. 4 by the numbers 31 and 32, respectively. Any time changing of the head is required, the workpiece is removed from the working station by the transfer slide, that is, the actuators 29 are reverse operated so as to release the jaw 15, the actuators 47 are reverse operated so as to unlock the guide 12 of the workpiece pallet in the groove 14, the actuators 33 are directly operated so as to push the indentation of the pallet away from the groove and finally the transfer slide is operated to carry away the workpiece with its pallet.

At the same time, an empty pallet suitable for the head is brought into the working station and precisely positioned and clamped by the means before described. At this point, the driving slide carrying the head is lowered until the toolholder rests on the pallet. While this operation can be easily performed by means of numerical control of the travel of the slide, this is not strictly required because any suitable travel limiting device, such as program switches, conveniently located, can control the execution of this operation.

Immediately after the clamping means, which lock the head to the driving slide, are released, so that the slide can be lifted, the head can be carried away from the working station together with its pallet. At the same time a new head can be brought onto the working station and the operation before described of clamping the pallet, lowering the slide, operating the clamping means for locking the head to the driving slide, can be performed in sequence in order to mount the new head on the slide.

Figure 5:
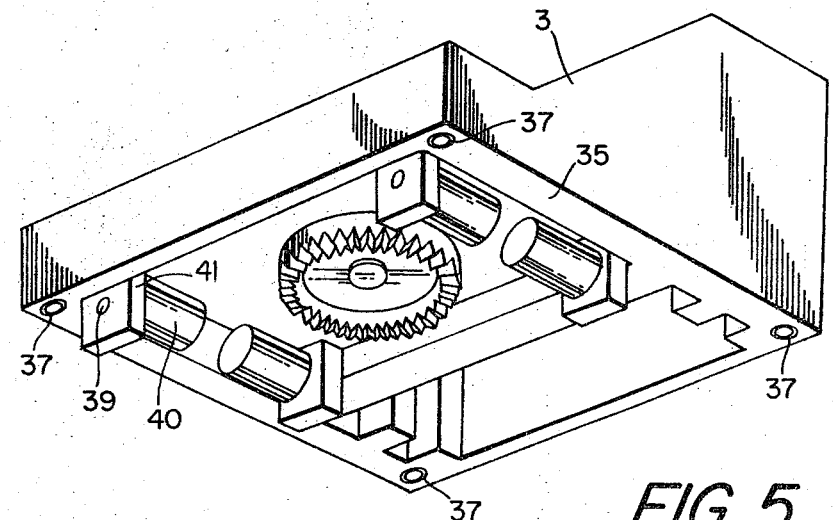
FIG. 5 is a perspective view of a driving slide, showing means for positioning and attaching a multiple spindle head.
Figure 6:
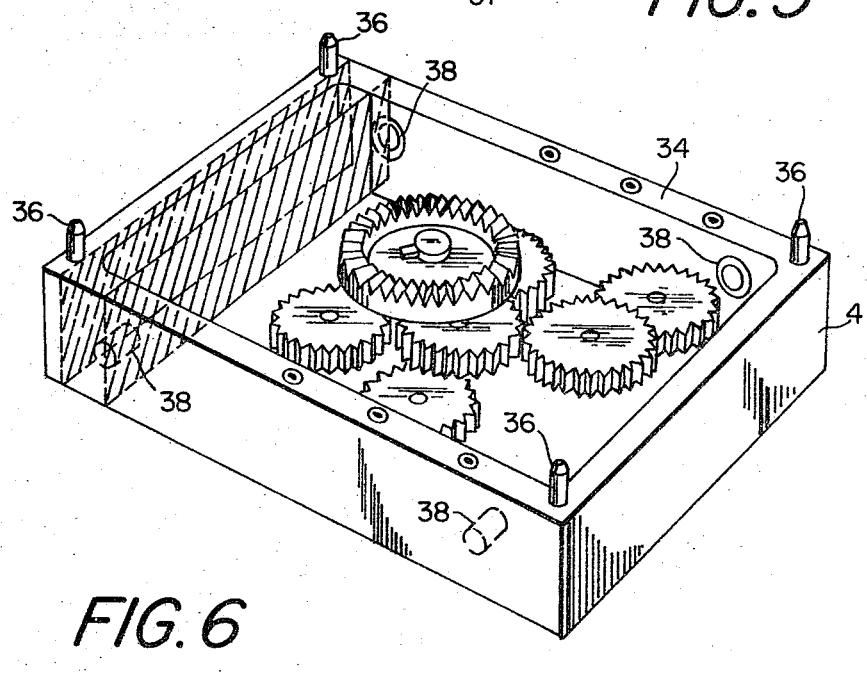
FIG. 6 is a perspective view of a head showing reciprocating means for positioning and attaching the head to the driving slide.
Figure 7:
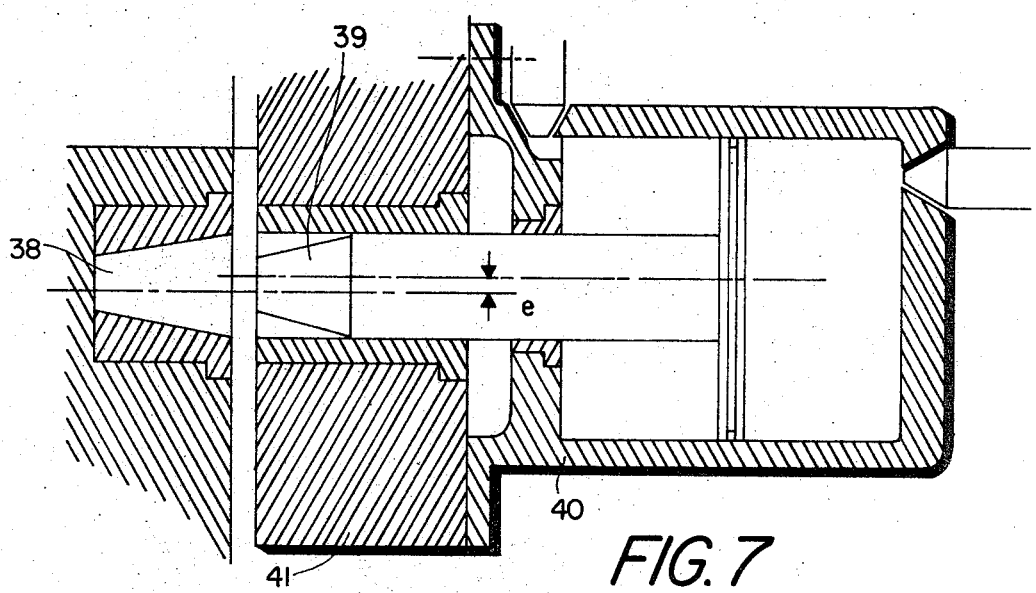
FIG. 7 is a sectional view of one suggested form of attaching means provided for attaching a head to the driving slide.

Now we refer to the clamping means for locking the head, mentioned before, to the driving slide. FIGS. 5 and 6 represent in some perspective view the driving slide 3 and the head 4 in order to show one embodiment of said clamping means. An upper edge 34 of the head provides a reference plane engageable with a lower edge 35 of the driving slide. Engageable pins 36 and sockets 37 are provided on these edges to precisely position longitudinally and transversely the toolholder with reference to the driving slide. Longitudinally extending frustroconical sockets 38 are also provided in the walls of the toolholder. Matching frustroconical pins 39 supported by suitable frames 41 located in the driving slide 3 are actuated by direct-reverse hydraulic actuators 40 so as to engage into the sockets 38. As shown in the fragmentary section of FIG. 7, as seen in the plane A of FIG. 6, the pins 39 are eccentrically shifted of a suitable amount e with reference to the axis of the sockets so that when the actuators 40 are operated to engage the pins into the sockets, a force component is developed between any pin and its respective socket which tends to clamp the upper edge of the toolholder against the lower edge of the driving slides, locking them together. In this way, the head becomes rigidly connected to the driving slide 3 and the possibility of displacements and vibration due to lateral play of the positioning means is is prevented. In this embodiment, the head is shown to comprise the tools, toolholder, gearing, guides (such as engageable pins and sockets) and clamps (such as the frustroconical sockets).

Also, if suitable gaskets are provided, it is possible to fill the cavity of the head 4 in which the driving means for the tools are contained with lubricating oil and/or to transfer to the tools, suitable cutting coolants.

Figure 9:
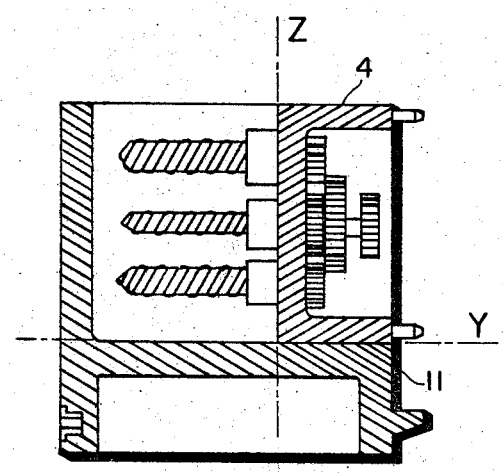
FIG. 9 is a schematic section of a pallet suitable for carrying a head provided for a longitudinal boring, drilling machine.
Figure 8:
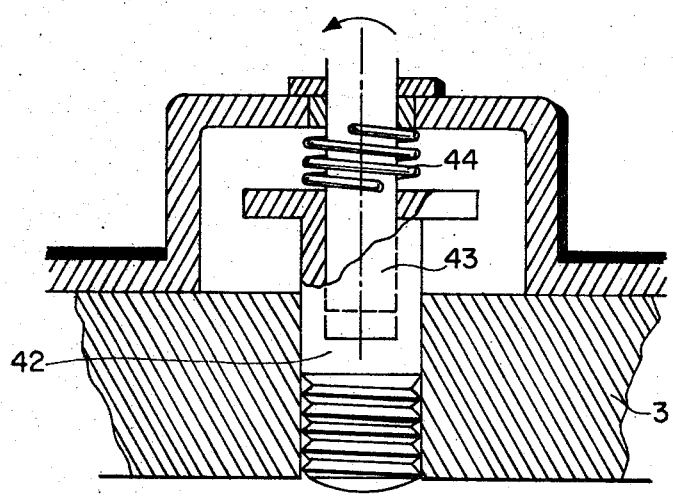
FIG. 8 is a sectional view of a second suggested form of attaching means provided for attaching a head to the driving slide.

It must be clear that other clamping means performing the same function can be provided. For instance, FIG. 8 is another fragmentary sectional view of said clamping means in which a screw 42 is actuated by a reversible rotating motor not shown, to engage an a. a first opening 42' in the wall of the head 4. The screw 42 is axially slidable onto a driving slide socket and the engagement of said screw when rotated by a square section shaft 43 into the opening 42' is insured by the spring 44. By reversing the rotation of the driving motor, the screw can be disengaged thus enabling the change of the toolholder. The same embodiment can be used if suitable pallets are provided in case of machine tools, with obliquely or longitudinally operated driving slides. In this case, the heads will preferably lie down in their pallets on one side as schematically represented in FIG. 9, and two reference planes Z, in which the aforedescribed positioning pins and sockets lie, and Y will be provided.

It is important at this point to make clear that even if it is convenient in certain cases to use pallets for conveying the head, this is not strictly required since other means which can be considered conventional parts of a machine tool can be used. For instance, the shoulder 10 can be conveniently high and shaped so as to support directly the heads and may be provided with rough positioning means. Alternatively, similar shaped legs not interfering with the workpiece when the machine tool is operating can be provided on the toolholder, or, in case of longitudinal operating machine tools, the head can lie down directly on the transfer slide.

After having shown how a toolholder can be changed by using the same means provided for operating the transfer machine, we refer to some possible working flow diagram.

Figure 10:
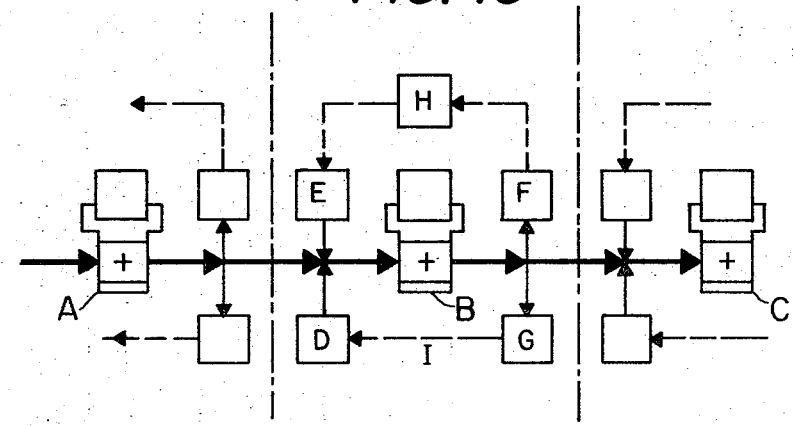
FIGS. 10 to 13 show work flow diagrams, when using one or more machine tools provided with an interchangeable head according to the invention.

FIG. 10 represents a working diagram flow suitable for a transfer line: three transfer machine tools are identified by the capital letters A, B, C. For any machine tool the flow diagram is substantially the same, so we refer for the purposes of explanation to the machine B. Let us suppose that, at the start of the working process, the machine B is not yet provided with a head. A storage means for the toolholder not yet used, in the following referred as new head, is provided and identified by the capital letter E. The capital letter D identified a storage for empty pallets, suitable for holding heads. It must be clear that these storage means can be considered as part of transfer slides or more generally of transfer means since they can consist of suitable roll conveyors, which store heads, pallets and if required, workpieces and move all these parts when timely operated to another part of the transfer means, such as, for instance, a main conveyor identified in FIGS. 10 through 13 by heavy arrows. Starting the process, a new head in its pallet is removed by transfer slides and brought to the working station of the machine B. Here the head is mounted as explained above on the driving slide of the machine tool. In the next step, the empty pallet which carries the new head is moved to the storage device G, and if required, is brought back to the storage D by means of any suitable conveyor represented by the dotted arrow I. At the same time, a workpiece subject to some machining in the station A is conveyed to the station B. In this station, work is started. When the workpiece has been machined, it is conveyed to the next machine C and in the same time, a new workpiece is brought from the machine A to the machine B, and so on. When a different kind of machining is required, or the tools become dull, the head is removed from the driving slide. An empty pallet is taken in the storage D and carried to the machine B, and the old head is layed down on it and conveyed to the storage F.

A new head is brought from the storage E to the machine B, and after a new workpiece has been brought from the machine A to the machine B, the machining by the machine B is started.

Meanwhile, if required, the old toolholder can be brought to a station H where, for instance, the tools are changed or sharpened, and then brought to the storage E.

It is clear that, by use of storage means like the described ones D, E, F, G, for each working station, simultaneous changes of the heads can be performed in each station. But, in order to decrease the initial cost of the plant, with some decreasing in the productivity due to the major time required for subsequently changing the heads, the storage means D, E, F, G can be provided for servicing all the transfer lines.

Figure 11:
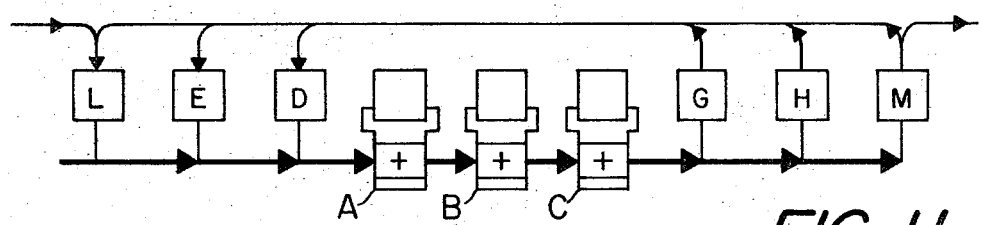

This embodiment is shown in FIG. 11 where storage L and M for finished and unfinished machined parts are also shown. In this case, any time one of the heads have to be changed, all the machining of the transfer line must be stopped because transferring of the heads involves all the working station.

Figure 12:
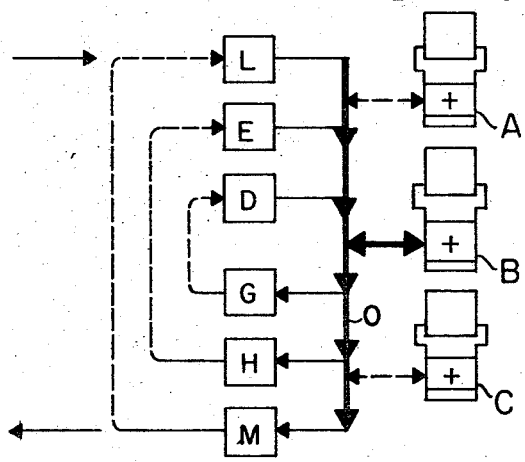

This inconvenience can be avoided if bidirectional transfer means are used. This embodiment is shown in FIG. 12. The working stations A, B, C are parallel connected to a common transfer bus so that changing of the workpieces or heads can be performed without involving all the working station.

Figure 13:
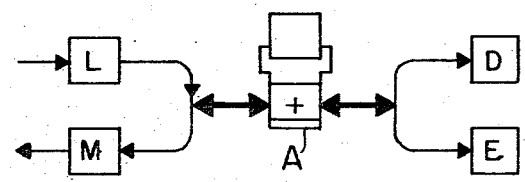

FIG. 13 represents another embodiment of production line in which the unfinished parts and finished parts enter and leave the working station from the same side, being respectively stored in L and M storages. The empty pallets and the heads on their respective pallets enter and leave the working station on the other side.

It is to be understood that the production lines shown are but a few examples of feasible combination which may be assembled, the better combination depending in any case from technical and economical factors which cannot be generalized. While the principles of the invention have now been made clear in illustrative embodiments, there will be immediately obvious to those skilled in the art, many modifications in structure and arrangement used in the practice of the invention without departing from those principles.

I claim:

1. In a spindle machine tool having a frame, elongated guide means provided on said frame, a driving slide engaged on said guide means, driving means for operating said driving slide, a tool head detachably connected with said driving slide, means for powering said head, and transfer means for moving a workpiece to and away from the machine tool, the improvement comprising:
   at least one substitute tool head;
   power means for automatically attaching and detaching one of said heads to said driving slide, said heads comprising at least one toolholder and associated tool and gearing; and
   power means for positioning at least one of said heads on said transfer means so as to move said last named head to and away from the driving slide by said transfer means.

2. A spindle machine tool as set forth in claim 1 in which said transfer means comprise a plurality of pallets on which the workpieces can be located and attached.

3. A spindle machine tool as set forth in claim 1 in which said means for positioning said heads on said transfer means comprise a plurality of pallets on which said heads can be located.

4. A spindle machine tool as set forth in claim 2 in which said means for positioning said heads on said transfer means comprise a plurality of pallets on which said heads can be located.

5. A method of machining a workpiece on which material working operations are to take place simultaneously, comprising the steps of:
   a. locating at least two separate spindle tool heads, comprising at least one toolholder, and associated tool and gearing, on transfer means disposed by a machine tool;
   b. locating a workpiece to be worked on the same transfer means;
   c. operating the transfer means to bring one of the heads to a driving slide forming part of the machine tool and attaching the head to the driving slide;
   d. operating the transfer means to bring the workpiece to the driving slide and performing a working operation thereon;

e. operating the transfer means to move the worked workpiece away from the driving slide;

f. operating the transfer means to bring a suitable portion thereof to the driving slide and detaching the first used head from the driving slide and locating it on the transfer means;

g. operating the transfer means to remove the first used head from the driving slide, and to convey another head to the driving slide and attaching it to the driving slide; and h. operating the transfer means to return the worked workpiece to the driving slide and performing another working operation thereon.

6. The method of claim 5 wherein the steps of moving and attaching the detaching heads, of moving a workpiece to and away from the driving slide, of machining a workpiece are repeated with different heads on the same workpiece until the workpiece is completely worked.

7. A method of automatically working a workpiece on which multiple material working operations are to take place simultaneously comprising the steps of:

a. attaching at least two separate spindle tool heads, comprising at least one tool holder and associated tool and gearing, on two separate suitable pallets conveyable by transfer means operable under control of a machine tool;

b. locating a workpiece to be worked on the same transfer means;

c. operating the transfer means to bring one of the heads located on one of said pallets to a driving slide forming part of the machine tool and attaching the head to the driving slide;

d. operating the transfer means to remove the empty pallet from the driving slide, and to convey to the driving slide a workpiece to be worked;

e. performing a working operation on said workpiece;

f. operating the transfer means to remove the worked workpiece from the driving slide;

g. operating the transfer means to convey to the driving slide an empty pallet and detaching the first used head from the driving slide and locating it on said empty pallet;

h. operating the transfer means to remove said first used head in said pallet from the driving slide and to convey another head, locating a second pallet on the driving slide and attaching it to the driving slide; and i. operating the transfer means to remove said second empty pallet from the driving slide and to return the worked workpiece to the driving slide, and performing another working operation on said workpiece.

8. The method of claim 7 wherein the steps of moving and attaching and detaching heads, of moving a workpiece to and away from the driving slide, of machining a workpiece, are repeated with different heads on the same workpiece until the workpiece is completely machined.

9. Apparatus for automatically working a workpiece on which multiple material working operations are to take place comprising at least two separate tool heads, each of said heads comprising at least one toolholder and associated tool and gearing, at least two separate pallets, power means for attaching said heads on respective pallets, transfer means for conveying said pallets in response to command signals, a workpiece, power means for locating said workpiece on said transfer means, said transfer means responsive to command signals to bring one of the heads located on one of said pallets to said driving slide, power means for removing said one head from its pallet and attaching said one head to the driving slide, means for operating the transfer means to remove said last named empty pallet from said driving slide and to convey to the driving slide a workpiece to be worked, means for performing a working operation on said workpiece using said one head, said transfer means responsive to command signals to remove the worked workpiece from the driving slide, said transfer means responsive to command signals to convey to the driving slide an empty pallet, power means for detaching the first used head from the driving slide and locating it on said empty pallet, said transfer means responsive to command signals to remove said first used head in said pallet from the driving slide and to bring another head attached on its respective pallet to said driving slide, power means for removing said another head from its pallet and attaching said another head to said driving slide, and said transfer means responsive to command signals to remove said second empty pallet from the driving slide and to return the worked workpiece to the driving slide and means for performing another working operation on said workpiece using said another head.